United States Patent
Baccini

(10) Patent No.: US 6,828,699 B2
(45) Date of Patent: Dec. 7, 2004

(54) LINEAR MOTOR AND METHOD TO MANUFACTURE SAID LINEAR MOTOR

(76) Inventor: Gisulfo Baccini, Via Duca d'Aosta, 1 - Mignagola di Carbonera (TV) (IT)

( * ) Notice: Subject to any disclaimer, the term of this patent is extended or adjusted under 35 U.S.C. 154(b) by 0 days.

(21) Appl. No.: 10/320,943

(22) Filed: Dec. 16, 2002

(65) Prior Publication Data

US 2003/0111915 A1 Jun. 19, 2003

(30) Foreign Application Priority Data

Dec. 14, 2001 (IT) .................................. UD2001A0208

(51) Int. Cl.$^7$ ............................................. H02K 41/02
(52) U.S. Cl. ........................................... 310/12; 29/596
(58) Field of Search ............................ 310/12, 13, 14; 29/598

(56) References Cited

U.S. PATENT DOCUMENTS

| | | | | | |
|---|---|---|---|---|---|
| 3,972,214 A | * | 8/1976 | Jagersberger | ................. | 72/132 |
| 4,049,750 A | * | 9/1977 | Brenner | ........................ | 525/25 |
| 4,329,308 A | * | 5/1982 | Langer et al. | ............... | 264/162 |
| RE34,674 E | * | 7/1994 | Beakley et al. | ................ | 310/12 |
| 5,723,917 A | | 3/1998 | Chitayat | ....................... | 310/12 |
| 5,808,381 A | * | 9/1998 | Aoyama et al. | .............. | 310/12 |
| 5,864,187 A | * | 1/1999 | Gonzalez | ..................... | 310/12 |
| 6,140,734 A | | 10/2000 | Hazelton et al. | ............ | 310/198 |
| 6,274,961 B1 | * | 8/2001 | Baumann et al. | ........... | 310/214 |
| 6,313,550 B1 | * | 11/2001 | Binnard et al. | ............... | 310/12 |
| 6,452,292 B1 | * | 9/2002 | Binnard | ....................... | 310/12 |

FOREIGN PATENT DOCUMENTS

| | | | | |
|---|---|---|---|---|
| GB | 2 352 094 A | | 1/2001 | |
| JP | 411196561 A | * | 7/1999 | ......... H02K/41/035 |

* cited by examiner

Primary Examiner—Thanh Lam
Assistant Examiner—Judson H. Jones
(74) Attorney, Agent, or Firm—Akin Gump Strauss Hauer & Feld, LLP

(57) ABSTRACT

Linear motor and method to make the same. The motor comprises an armature equipped with compartments (15) inside which are housed electric coils (16), and one fixed bar (22) cooperating with one side of the armature, on which are mounted permanent magnets (12) arranged facing the electric coils (16). The armature (14) is made of aluminium or of ceramic material. The armature (14) comprises, in the perimeter of the compartments (15) housing the coils (16), interruptions (21) defining zones of electric discontinuity.

18 Claims, 2 Drawing Sheets

LINEAR MOTOR AND METHOD TO MANUFACTURE SAID LINEAR MOTOR

FIELD OF THE INVENTION

The invention concerns a linear motor of the synchronous brushless type excited by permanent magnets.

To be more exact, the invention concerns a linear motor of the type comprising a mobile armature, slider or cursor, equipped with a plurality of compartments inside which respective electric coils are stably housed, and one fixed bar on which a plurality of permanent magnets are mounted and arranged, during use, facing the electric coils.

The mobile armature of the motor is made of aluminium or its alloys or of ceramic material, and is suitable to house also a ferromagnetic bar which cooperates with the coils to close the magnetic circuit.

The invention also concerns the method to manufacture the linear motor.

BACKGROUND OF THE INVENTION

The state of the art, as disclosed for example in GB-A-2.352.954, includes synchronous brushless linear electric motors of the general type as described above. Such motors comprise a mobile part which normally consists of an armature or frame on which the housing compartments are made, normally equidistant, inside which electric coils associated with feed means are inserted and clamped.

A relative fixed bar, normally made of ferromagnetic material, is present in a position facing at least one side of the armature; a plurality of permanent magnets are mounted on the fixed bar, arranged aligned and usually equidistant in the direction of movement of the armature which carries the electric coils. The magnets have alternating polarities.

In other constructional embodiments, the motor can have the fixed part comprising the electric coils and the mobile part comprising the permanent magnets.

The armature where the coils are housed and the ferromagnetic bar on which the permanent magnets are mounted are separated from each other by an air interspace.

The working principle of linear motors of this type exploits the force of repulsion which is created by sequentially inverting the direction of circulation of the electric current circulating in a coil every time the coil moves from a position facing a magnet with a certain polarity, for example, positive, to a position facing a magnet with a negative polarity.

In conventional motors (see for example U.S. Pat. No. 6,140,734) the coils are buried in an insulating material, for example resin, inside the respective housing compartment of the armature, and are cemented in the furnace by means of heat treatment which causes the resin to be activated (melted) and penetrate between the spirals of the coil. The insulating material is necessary to eliminate phenomena of magnetic friction between adjacent coils which cause a deterioration to the performance of the motor.

The insulating material, having set between the spirals of the coil, also acts as a mechanical support for the stable accommodation of the coils in the relative compartments of the armature, in order to ensure a precise positioning with respect to the fixed magnets.

However, it has been found that using a hot cementing process on insulating material causes a lack of mechanical rigidity due to the interstices between the spirals which are not completely filled, particularly in the inner compartment of the coils. When the motor is used at high frequency conditions, in the long term mechanical stresses are created on the coil which lead to a loosening of the spirals which are thus exposed to the environment, with negative repercussions on the functioning and efficiency of the motor.

The presence of interstices between the spirals causes a deterioration in the interaction conditions of the magnetic fields produced respectively by the current circulating in the coils, and by the permanent magnets, with a reduction in the value of the force of repulsion which drives the motor.

Moreover, the presence of insulating material functioning as a mechanical support for the coils determines a low capacity to dissipate the heat generated by the Joule effect, with consequent problems of overheating in the armature of the coils.

The present Applicant has devised and embodied this invention to solve the shortcomings of the state of the art, and to obtain further advantages.

SUMMARY OF THE INVENTION

The invention is set forth and characterized essentially in the respective main claims, while the dependent claims describe other innovative characteristics of the invention.

The purpose of the invention is to achieve a brushless linear motor of the synchronous type, with permanent magnets, which has improved characteristics of mechanical resistance to stresses, heat dissipation, structural stability of the spirals buried in the armature, smaller overall bulk, efficiency and speed of response.

Another purpose is to obtain a low-cost and low-weight linear motor which can in any case guarantee a sufficiently high motive power substantially for all the applications where it can be used.

In accordance with these purposes, according to a first characteristic, the linear motor according to the invention comprises a structural armature made mainly of aluminium, or alloys thereof, in which the compartments are made to stably house a plurality of mating coils associated with electric feed means and aligned substantially along the direction of motion.

According to another characteristic, the structural armature is made mainly of ceramic material.

Using a structural armature made mainly of aluminium, or alloys thereof, or ceramic material, allows to guarantee great mechanical rigidity while keeping the overall weight limited, even in conditions of great stress, for example deriving from a prolonged use of the motor at high frequencies.

Moreover, the structural armature made of aluminium or ceramic ensures a great capacity of heat dissipation, which prevents possible overheating deriving from a prolonged circulation of electric current in the spirals of the coils.

The linear motor according to the invention also comprises one fixed bar only, on which are mounted, in a position facing the coils of the mobile armature, a plurality of permanent magnets suitably distanced and with reciprocally alternating polarity.

The presence of a single fixed bar of magnets allows a considerable saving in terms of cost and weight of the motor, and considerable advantages in terms of improved heat dissipation. The overall motive force is slightly reduced with respect to a traditional motor with two rows of magnets, but remains in any case high enough substantially for all cases of possible application.

Behind the coils, with respect to the side facing the magnets, a bar made of ferromagnetic material is mounted on the armature, by means of which bar the magnetic circuit established between the coils and the magnets is closed.

According to another characteristic of the invention, the structural armature made of aluminium or ceramic has, in cooperation with at least a segment of the perimeter surrounding said housing compartments of the coils, interruptions which define electric discontinuities and are able to prevent the electric circuit from closing on the armature itself; these interruptions are also able to avoid that the currents induced on the armature flow freely along the armature itself and disturb the operation of the motor.

In a first embodiment the interruptions or discontinuities are made on a lateral segment of the armature which separates two adjacent housing compartments of the relative coils. According to another embodiment, the interruptions or discontinuities are made in cooperation with an upper or lower segment of the relative housing compartment.

According to a preferential embodiment of the invention, the aluminium or ceramic structural armature which defines the housing compartments of the coils comprises at least a module able to define casting fissures inside which an insulating material is poured in the liquid or melted state, for example polymerizable resin or other material comparable therewith.

During the casting, the insulating material penetrates in depth until all the interstices between the spirals of the coils, and also the inner compartment of the coils, are filled. The resin sets and stabilizes, by means of polymerization, forming a stable whole with the relative coils; this whole guarantees absolute mechanical stability, electric insulation, good capacity of heat dissipation and that there are no empty spaces where electricity cannot be conducted.

According to a variant, on a plane transverse to the direction of advance of the mobile armature, the motor comprises two coils, or multiples of two, adjacent and substantially parallel, made by means of a single continuous winding.

Using a single winding to form two adjacent coils, the two ends of the conductor, connected to the source of feed to form the electric circuit, always emerge from the outer periphery, respectively of one and the other coil, remaining contained inside the lateral bulk of the coil itself. With this configuration there are no lateral thicker parts formed due to the end of the conductor emerging from the armature, which thicker parts can compromise an efficient filling of the empty spaces by the insulating material and hence create problems of correct electric conduction, heat dissipation and mechanical stability.

In a preferential embodiment, the armature comprises at least a module, comparable from the electric point of view with a single coil, configured dimensionally so as to contain two coils, or multiples of two, or pairs of coils, arranged aligned in the direction of motion.

According to a variant, the module is suitable to contain three coils, or multiples of three, or pairs of coils arranged aligned in the direction of motion.

The module has a size, in the direction of movement, such as to cover an even number of magnets so that, during the movement of the mobile part of the motor, the sign of the magnet which is left is always equal to the sign of the new magnet which is covered by the armature which bears the coils. In this way, the induced currents which are generated between adjacent magnets and which close on the metal armature are mutually cancelled and therefore do not oppose, or in any case create interference with, the motion and/or the performance of the motor.

BRIEF DESCRIPTION OF THE DRAWINGS

These and other characteristics of the invention will be apparent from the following description of a preferential form of embodiment, given as a non-restrictive example, with reference to the attached drawings wherein.

DETAILED DESCRIPTION OF PREFERENTIAL EMBODIMENT

Figure 1:
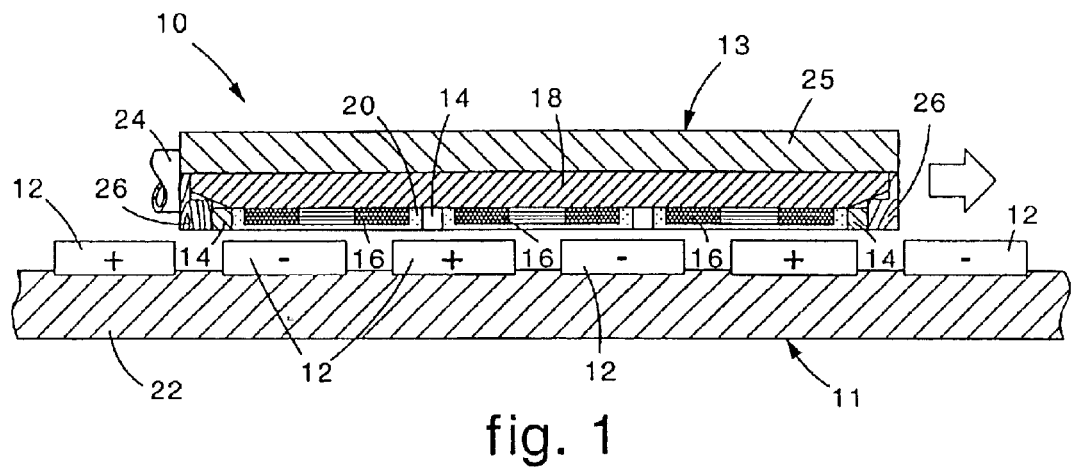
FIG. 1 is a plane view of a linear motor according to the invention.
Figure 2:
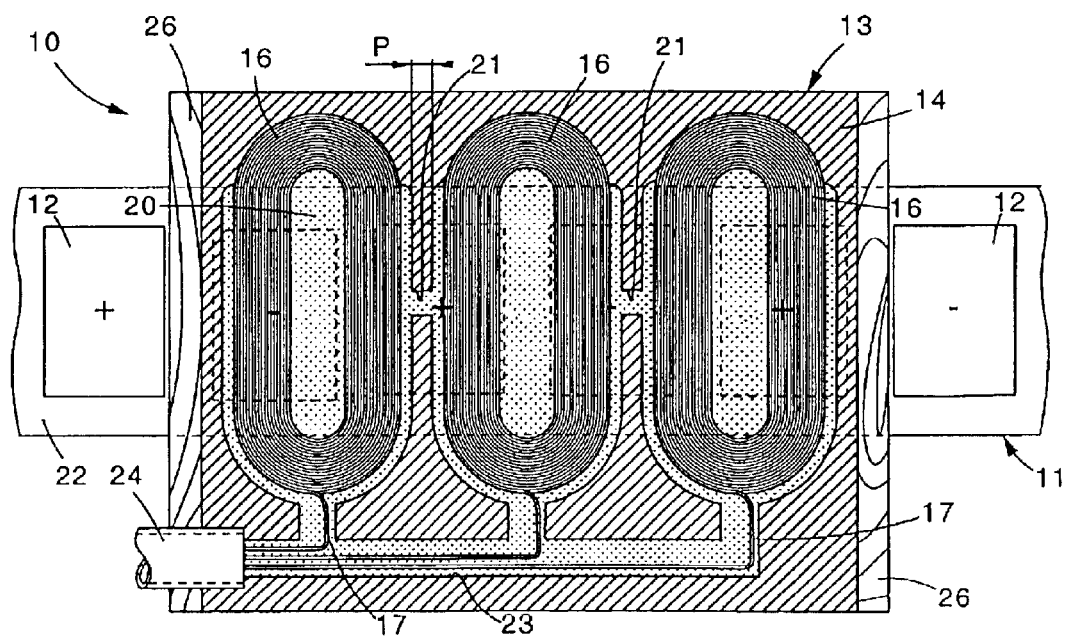
FIG. 2 is a part section from A to A of FIG. 1.
Figure 3:
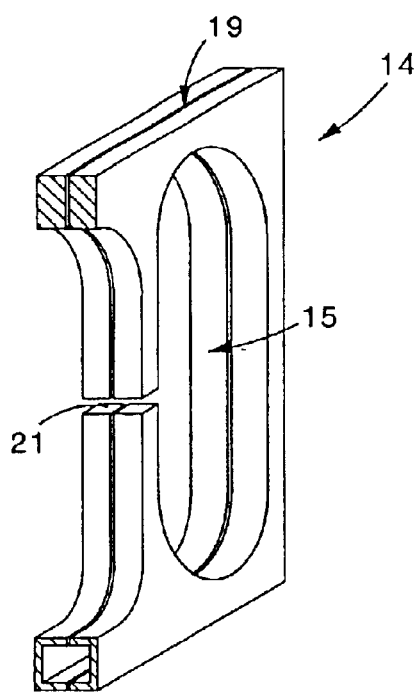
FIG. 3 shows a detail of the coil-bearing armature of the linear motor of FIG. 1.

With reference to the attached figures, a synchronous brushless linear motor according to the invention is indicated generally by the reference number 10. It comprises a fixed part 11 which, in this case, comprises a bar 22, made of ferromagnetic material, on which a plurality of permanent magnets 12 are mounted, substantially equidistant and with reciprocally alternating polarity.

The motor 10 also comprises a mobile part 13, arranged facing the bar 22, consisting of a frame or armature 14 made mainly of aluminium or its alloys, or of ceramic material.

The armature 14 is suitable to define a plurality of compartments 15 to house mating electric coils 16. In this case, the compartments 15 are substantially rectangular in shape: the lateral segments are straight and the upper and lower segments are curved.

Using aluminium or its alloys or ceramic material as the material for the armature 14 ensures a lighter weight, greater mechanical rigidity, good capacity to dissipate heat and good electric conductivity.

In this case, the armature 14 is made of modules, each comprising three coils 16 arranged aligned along the direction of motion.

Figure 4:
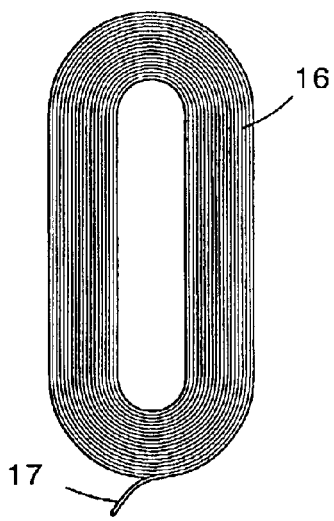
FIG. 4 is a front view of a coil used in the linear motor in FIG. 1.
Figure 5:
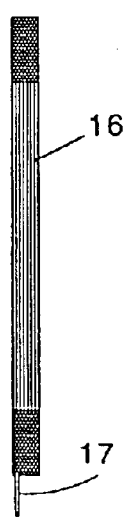
FIG. 5 is a transverse section of the coil shown in FIG. 4.

The coils 16 are made (FIG. 4) with a conductor 17 wound continuously.

Figure 6:
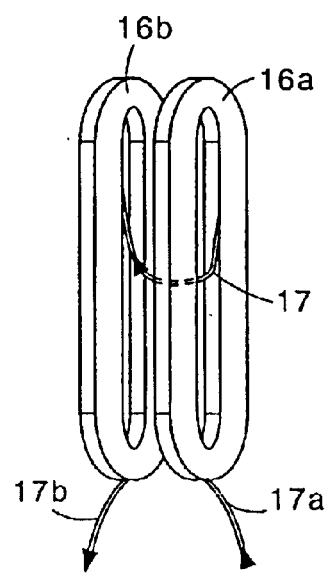
FIG. 6 is a prospective view of two, electrically connected coils as used in the linear motor shown in FIG. 1.

According to the variant shown in FIG. 6, transverse to the direction of motion there are two coils 16a and 16b, parallel to each other and achieved with a single continuous winding.

The first coil 16a is formed by winding the conductor 17, starting from a first end 17a connected to a source of feed, developing from the outside towards the inside of the coil. The second coil 16b is formed by winding the conductor 17 developing from the inside to the outside, so that the second end 17b connected to the source of feed is, like the first 17a, also on the outer periphery of the relative coil.

Thanks to this configuration, with a double adjacent coil 16a and 16b, the two ends 17a and 17b which emerge from the armature 14 remain contained within the lateral bulk of the relative coil, respectively 16a and 16b; therefore no thicker parts are created on the sides which might cause empty spaces and interstices which would compromise the electric conduction and weaken the mechanical rigidity of the whole. Moreover, the value of the air gap is optimized.

After the coils 16 have been inserted and assembled into the respective housing compartments 15, an insulating and binding material, for example resin 20, is cast into fissures 19 made in correspondence with part of the perimeter of the armature 14.

According to the invention, therefore, the armature 14 functions as a mold for casting the melted resin 20, which penetrates into the interstices between the spirals of the relative coils 16, filling all the empty spaces and the fissures between the spirals and the armature 14 and the inner compartment of the coils.

When the resin 20 polymerizes and is chemically stabilized, it constitutes a single block with the relative coils 16, forming a conductive whole which, with regard to the permanent magnets 12, behaves substantially as a single spiral.

This single block, without interstices and empty spaces, ensures a considerable mechanical rigidity which allows a prolonged use of the motor even at high frequencies, without the risk of failure or loosening. Moreover, absorption and the contact of the conductor 17 with contaminating material such as water, oil, dust or otherwise is limited to a minimum, or even totally eliminated.

A bar 18 made of ferromagnetic material is associated with the armature 14 which carries the coils 16, in a position behind that of the magnets 12; the magnetic circuit established between the coils 16 and the magnets 12 closes on said bar 18. The bar 18 is suitably shaped on the heads, in order to reduce to a minimum the reluctance effect, and has a length equal to or a multiple of the polar pitch plus ⅔ of ½ pitch, and an inclination of about 150°.

The mobile part 13 also comprises, behind the bar 18, a support 25, also advantageously made of aluminium or its alloys or of ceramic material, anchored to the armature 14.

The support 25 cooperates at the ends with closing L-bars 26, made in this case of synthetic fiber.

To prevent the electric current from closing entirely on the armature 14, apertures or interruptions of electric discontinuity are provided in a position surrounding the relative compartments 15 housing the coils 16. When the resin is applied, the apertures of electric discontinuity 21 are also completely filled with resin 20.

In the embodiment shown in FIG. 1, the apertures of discontinuity 21 are made on the lateral segments of the housing compartments 15 whereas, according to a variant, the apertures are made on the upper segment of the relative compartment 15. In cooperation with the lower part of the armature 14 there is a channel 23 which allows the ends of the conductors of each of the coils 16 to emerge; they are joined by means of a connector 24 which is connected to a source of feed, not shown here.

In one embodiment of the invention, the longitudinal size of the armature 14, and hence of the bar 18 and of the support 25, is such as to cover during use an even number of permanent magnets 12, in this case four; in this way, the polarity of the new magnet 12 facing the coils 16a, 16b during the movement of the mobile part 13 is equal to the polarity of the magnet 12 which remains uncovered after said part 13 has moved.

This geometric configuration is advantageous from the electric point of view, since it leads to an annulment of parasitic electric currents which close between magnet and magnet using the armature 14 as an electric circuit.

In a further form of embodiment, the armature 14 is made in such a manner that the distance "p" between two longitudinally adjacent compartments 15 is equal to, or less than, the distance between two adjacent permanent magnets 12. In this way, the metal part of the armature 14 between two adjacent coils 16 does not function as a further spiral, thus interfering with the correct functioning of the electric motor 10.

It is clear however that modifications and/or additions can be made to the induction linear motor 10 and its method of manufacture as described heretofore without departing from the field and scope of the present invention.

For example, the armature 14 carrying the coils 16 could be fixed while the bar 22 with the permanent magnets 12 could be mobile. It is also within the spirit of the invention that the armature 14 comprises several modules with other than three coils 16 aligned longitudinally.

It also comes within the field of the invention that the longitudinal development of the armature 14 covers two, six or more permanent magnets 12, or the armature 14 comprises parts, for example external, not made completely of aluminium or ceramic.

The insulating and binding material used to stabilize and electrically insulate the coils 16 could be something other than resin, provided that it has substantially the same physical-chemical characteristics.

What is claimed is:

1. A linear motor comprising an armature equipped with a plurality of compartments (15) inside of which are stably housed respective electric coils (16), the motor including a fixed bar (22) cooperating with one side of said armature, the bar having a plurality of permanent magnets (12) mounted thereto and arranged, during use, facing said electric coils (16), wherein said armature (14) is made mainly of aluminium or its alloys, or of ceramic material, said armature (14) including interruptions which cooperate at least with the perimeter of said compartments (15) housing the coils (16), the interruptions (21) defining zones of electric discontinuity.

2. The linear motor of claim 1, wherein said interruptions (21) are formed on at least a lateral segment of a relative housing compartment (15).

3. The linear motor of claim 1, wherein said interruptions (21) are formed on at least an upper or lower segment of a relative housing compartment (15).

4. The linear motor of claim 1, wherein said armature (14) cooperates, in a position behind said coils (16) with respect to the position of said permanent magnets (12), with at least a bar (18) made of ferromagnetic material which completes the magnetic circuit established between said coils (16) and said permanent magnets (12).

5. The linear motor of claim 4, further comprising a supporting plate (25) positioned behind said bar (18) made of ferromagnetic material.

6. The linear motor of claim 5, wherein said supporting plate (25) is made of aluminium or its alloys.

7. The linear motor of claim 5, wherein said supporting plate (25) is made of ceramic material.

8. The linear motor of claim 1, wherein said armature (14) defines casting fissures (19) into which an insulating material in a liquid or molten state is cast.

9. The linear motor of claim 8, wherein said insulating material is a polymerizable resin.

10. The linear motor of claim 1, wherein the coils (16) are formed by substantially continuously winding a conductor (17).

11. The linear motor of claim 1, wherein said armature (14) is configured to contain a multiple of two coils (16a, 16b) adjacent each other on a plane transverse to the direction of movement, wherein the coils are formed by substantially continuously winding a conductor (17).

12. The linear motor of claim 1, wherein said armature (14) includes at least one module defining a plurality of compartments (15) configured to house respective coils (16) aligned in the direction of movement, the longitudinal development of said module being such as to cover an even number of permanent magnets (12).

13. The linear motor of claim 12, wherein said at least one module comprises a number of coils (16) equal to a multiple of two.

14. The linear motor of claim 12, wherein said module comprises a number of coils (16) equal to three or a multiple of three.

15. The linear motor of claim 1, wherein a distance "p" between two adjacent housing compartments (15) is equal to or less than the distance between two adjacent permanent magnets (12).

16. A method of manufacturing an electric motor having an armature equipped with a plurality of compartments (15) configured to stably house respective electric coils (16) therein, and a fixed bar (22) cooperating with one side of said armature, the bar having a plurality of permanent magnets (12) mounted thereto and arranged, during use, facing said electric coils (16), the method comprising forming said armature (14) from a plurality of mateable bodies made mainly of aluminium or its alloys or of ceramic material, said bodies defining the plurality of compartments (15), casting an insulating and binding material (20) such as a polymerizable resin in its liquid or molten state into fissures (19) defined on the perimeter of said armature (14) between said mateable bodies, and polymerizing said insulating and binding material, the armature functioning as a mold for the casting and polymerization of said insulating and binding material (20).

17. The method of claim 16, wherein said polymerization is performed cold.

18. The method of claim 16, wherein said polymerization is performed hot.

* * * * *